(No Model.) 2 Sheets—Sheet 1.

J. HADDEN.
SAW TOOTH DRESSER.

No. 375,623. Patented Dec. 27, 1887.

Witnesses:

Inventor
James Hadden
By Edmund D. Barry
Attys.

(No Model.) 2 Sheets—Sheet 2.

J. HADDEN.
SAW TOOTH DRESSER.

No. 375,623. Patented Dec. 27, 1887.

WITNESSES:

INVENTOR
James Hadden
BY
Edmund D. Barry
ATTORNEY

UNITED STATES PATENT OFFICE.

JAMES HADDEN, OF LE ROY, MICHIGAN.

SAW-TOOTH DRESSER.

SPECIFICATION forming part of Letters Patent No. 375,623, dated December 27, 1887.

Application filed August 26, 1887. Serial No. 247,962. (No model.)

*To all whom it may concern:*

Be it known that I, JAMES HADDEN, a citizen of the United States, residing at Le Roy, in the county of Osceola and State of Michigan, have invented certain new and useful Improvements in Saw-Tooth Dressers; and I do hereby declare the following to be a full, clear, and exact description of the invention, such as will enable others skilled in the art to which it appertains to make and use the same.

My invention relates to appliances for finishing or dressing the sides and points of saw-teeth after they have been swaged, in order to render said teeth uniform in thickness or width with respect to each other and without reference to any irregularity arising by reason of the flexibility of the saw-plate; and the object of my invention is to provide a device which shall operate simultaneously on both sides of the teeth, and which shall not be affected in its operation by any unevenness or lack of uniformity in the back of the saw. Also, a further object of my invention is to provide devices whereby any desired angle may be imparted to the files for operating upon the teeth.

To the accomplishment of the ends stated my invention consists in a saw-dresser which is so constructed as to embrace only the operative or cutting portion of the saw, and is provided with adjustable connections for attachment to said saw and for regulating the positions of the files; also, in certain peculiar or novel features of construction and arrangement or combination of parts, as hereinafter disclosed in the description and claims.

In order that my invention may be fully understood by those skilled in the art I will proceed to describe the same in connection with the accompanying drawings, wherein the same letters of reference indicate the same parts, and in which—

Figure 1:
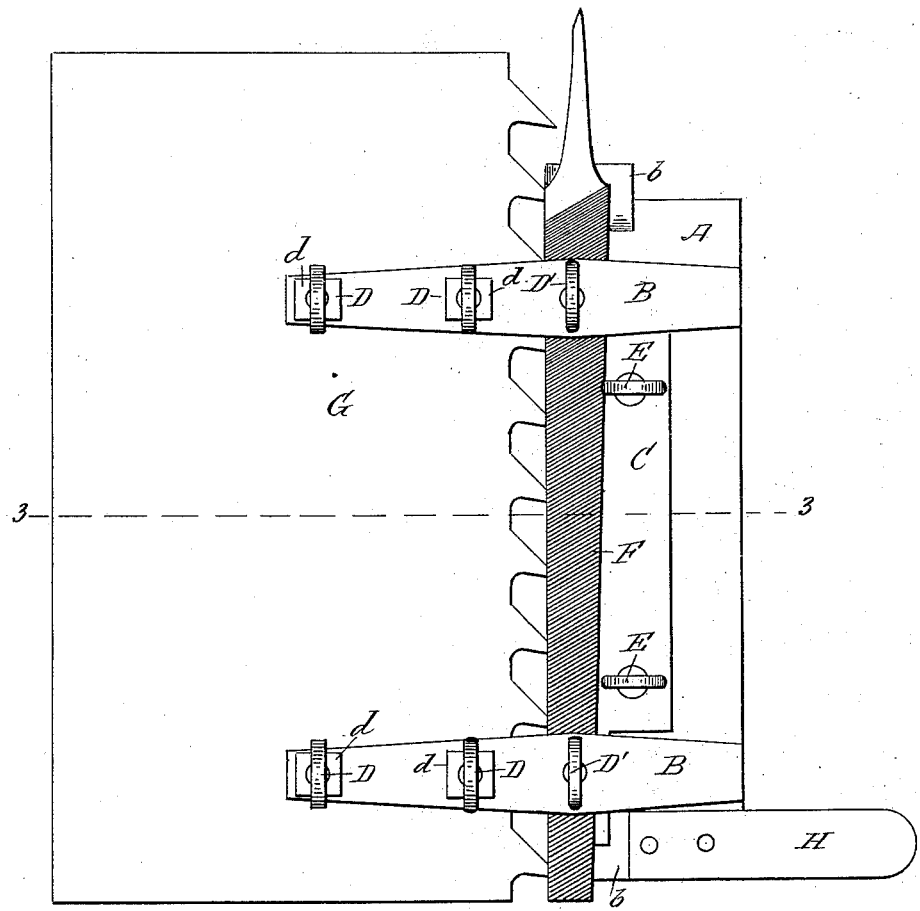
Figure 5:
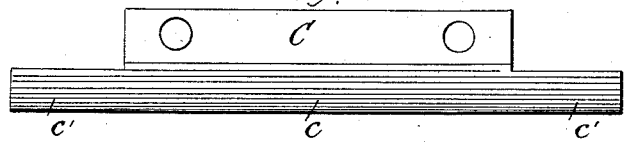
Figure 4:
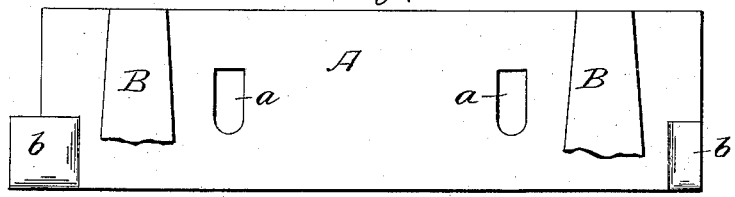
Figure 3:
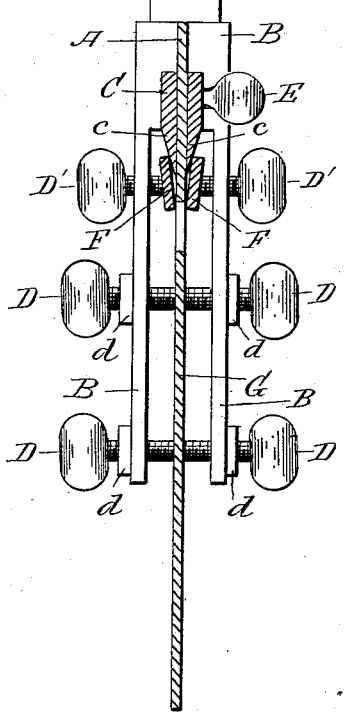
Figure 2:
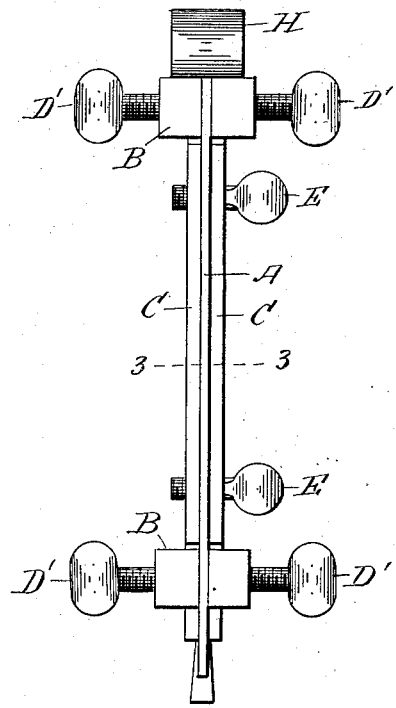

Figure 1 represents a side elevation of a portion of a saw with my improved saw-tooth dresser applied thereto. Fig. 2 is a front elevation of my improved saw-tooth dresser proper. Fig. 3 is a cross section of the same on the line 3 3 of Figs. 1 and 2. Figs. 4 and 5 are detail views of the back plate and one of the beveled side plates of the dresser.

My improved saw-tooth finisher or dresser is designed for application to both gang and band saws, and serves to reduce the saw-teeth to uniform width or thickness throughout. After saws have been subjected to the swaging operation their teeth are not regular or uniform in thickness or width, and consequently the teeth have to be dressed off or finished at their sides in order that the saws may be in proper condition for effective work. Heretofore devices for this purpose have been applied to the backs or centers of saws—according as the saws are of the circular or straight form—which, owing to the irregularities or unevenness in their body portions, detracts from perfect uniformity in the action of such dressers. A saw-tooth dresser constructed in accordance with my invention is free from all of these objections, because it acts directly upon the cutting portion of the saw and is not affected by irregularities in the body portion thereof.

In the drawings referred to, A designates a thin, oblong, rectangular piece of metal which constitutes the back plate of the finisher or dresser. Near each end of this back plate, A, are formed or secured two forwardly-extending parallel arms, B B, located on its opposite sides, and above and below these arms said plate has on each side, at its inner edge, beveled abutments *b b*; also, in the upper and lower portions of said plate are formed elongated slots *a a*, which extend parallel with and near the arms B B.

C C designate two long steel plates, which are formed with beveled portions *c c*, extending along their forward margins or edges, each bevel being formed on the outer side of its plate.

*c' c'* designate beveled extensions formed on the ends of the plates C C and corresponding to the beveled abutments *b b*, for the purpose hereinafter stated.

D D designate thumb-screws, which are inserted into screw-threaded holes formed in the arms B B and provided with clamp-nuts *d d*, which bind against the outer sides of said arms.

E E designate the thumb-screws, which pass through the slots *a a* in the back plate, A, and enter screw-threaded holes in one or both of the plates C C.

F F designate the files, which are inserted between the arms B B and the front beveled edges of the plates C C and on opposite sides of the front part of the back plate, A. Against these files the inner thumb-screws, D' D', impinge, so as to firmly hold said files in place. Both files are held in position by these thumb-screws; but after the dresser has been once adjusted for work it will only be necessary to loosen the file on one side for admitting the saw-teeth.

The saw, which is indicated by the letter G, is held in position, with its teeth projecting upward, on pulleys or on any other suitable support or stay. The inner thumb-screws, D' D', opposite the inner side of the back plate, A, are loosened, so as to release one of the files. Then the cutting-edge of the saw is caused to enter between the arms B B, its teeth being brought against the rear or inner edge of the back plate, A. The thumb-screws D D are then screwed inward against the sides of the saw and are there held by their nuts $d$. Then the loosened file is placed in position and held by the inner thumb-screws, D' D'. The dresser, with its files, is now moved back and forth along the saw-teeth, a handle, H, being secured upon one end of the back plate, A, for convenience of manipulation. Thus the sides of the teeth are finished or dressed by the files to uniform thickness or width. The plates C C are set more or less forward or backward upon the back plate, A, and held by their screws E E. The files F F are then correspondingly adjusted and held by the inner thumb-screws, D' D', against the beveled portions $c\ c$ of the plates C C, said beveled portions $c\ c$, in connection with the beveled abutments $b\ b$ of the back plate, serving to incline the files transversely, and thus impart any required finish to the saw-teeth, including any angle or bevel that may be desired.

From the foregoing it will be seen that the teeth are dressed simultaneously on both sides, and that the operation of the device is not affected by any unevenness in the saw-body, from the fact that the arms B B only extend over the sides of the saw, while the files embrace the teeth and operate to finish or dress them with accuracy; also, it will be obvious that my improved saw-tooth dresser is simple and effective in its construction and operation, strong and durable, easily understood and handled, accessible in all of its parts, and cheaply manufactured.

Some of the details of construction and the arrangement of the dresser may be modified or changed without departing from the nature or principle of my invention—as, for instance, the dresser may be held stationary and the saws or saw-teeth moved within the same.

Having thus fully described my invention, what I claim as new is—

1. The herein-described saw-dresser, provided with a back plate having forwardly-extending arms arranged in pairs, the files, and thumb-screws for holding the same and the saw, substantially as described.

2. The combination, with the slotted back plate, A, provided with the arms B B, of a pair of adjustable beveled plates, C C, interposed between said arms and arranged on opposite sides of said back plate, the files F F, and the thumb-screws for holding the said beveled plates, the files, and the saw, substantially as set forth.

3. The combination of the back plate, A, formed with the slots $a\ a$ and having the arms B B arranged in parallel pairs at or near its opposite ends, with the beveled plates C C, the files F F, the thumb-screws D D D' D', clamp-nuts $d\ d$, and the thumb-screws E E, substantially as described.

4. The combination of the back plate, A, formed with the slots $a\ a$ and having the beveled abutments $b\ b$, and the arms B B, arranged in parallel pairs at or near its ends, with the plates C C, having the beveled surfaces $c\ c$ and extensions $c'\ c'$, the thumb-screws D D, D' D', and E E, and the files F F, substantially as and for the purpose specified.

In testimony whereof I affix my signature in presence of two witnesses.

JAMES HADDEN.

Witnesses:
EDWIN F. UHL,
THOS. FNAUT.